US006814211B2

(12) United States Patent
Yunker et al.

(10) Patent No.: US 6,814,211 B2
(45) Date of Patent: Nov. 9, 2004

(54) SLIDE FOR SORTING MACHINE

(75) Inventors: Mark James Yunker, Sugarland, TX (US); Dale A. Svatek, Needville, TX (US)

(73) Assignee: Satake USA, Inc., Houston, TX (US)

( * ) Notice: Subject to any disclaimer, the term of this patent is extended or adjusted under 35 U.S.C. 154(b) by 0 days.

(21) Appl. No.: 09/904,387

(22) Filed: Jul. 12, 2001

(65) Prior Publication Data

US 2003/0010684 A1 Jan. 16, 2003

(51) Int. Cl.[7] ................................................ B65G 11/20
(52) U.S. Cl. ...................... 193/25 FT; 193/46; 209/911
(58) Field of Search ................................ 209/908, 911, 209/920, 922; 193/25 FT, 33, 46; 198/771

(56) References Cited

U.S. PATENT DOCUMENTS

| | | | | | |
|---|---|---|---|---|---|
| 717,726 | A | * | 1/1903 | Vincke | 209/625 |
| 735,396 | A | * | 8/1903 | MacDonald | 209/676 |
| 2,739,696 | A | * | 3/1956 | Heide | 198/463.5 |
| 2,990,935 | A | * | 7/1961 | Bailey | 198/383 |
| 3,107,767 | A | * | 10/1963 | Medoff et al. | 193/15 |
| 3,882,993 | A | * | 5/1975 | Mead | 198/524 |
| 3,958,687 | A | * | 5/1976 | Adams et al. | 193/38 |
| 4,018,674 | A | * | 4/1977 | Morris | 131/312 |
| 4,042,100 | A | * | 8/1977 | Morrone | 198/446 |
| 4,196,811 | A | * | 4/1980 | Pilesi et al. | 209/588 |
| 4,347,923 | A | * | 9/1982 | Wong | 193/25 FT |
| 4,367,817 | A | * | 1/1983 | Satake | 209/580 |
| 4,378,897 | A | * | 4/1983 | Kattelmann | 198/316.1 |
| 4,567,652 | A | * | 2/1986 | Gussman et al. | 29/741 |
| 4,596,327 | A | * | 6/1986 | Yamano | 177/25.18 |
| 4,601,382 | A | * | 7/1986 | Roberts et al. | 198/432 |
| 4,700,827 | A | * | 10/1987 | Haaser | 198/771 |
| 4,927,001 | A | * | 5/1990 | Hendricks | 198/463.5 |
| 5,009,550 | A | * | 4/1991 | Hilbish et al. | 209/656 |
| 5,236,092 | A | * | 8/1993 | Krotkov et al. | 198/609 |
| 5,277,300 | A | * | 1/1994 | Maggioni | 198/752.1 |
| 5,348,164 | A | * | 9/1994 | Heppler | 209/573 |
| 5,360,092 | A | * | 11/1994 | Sachtschale et al. | 193/1 |
| 5,489,019 | A | * | 2/1996 | DiNanno et al. | 193/25 FT |
| 5,845,784 | A | | 12/1998 | Gray et al. | |

* cited by examiner

*Primary Examiner*—Donald P. Walsh
*Assistant Examiner*—Daniel K Schlak
(74) *Attorney, Agent, or Firm*—Keeling Hudson L.L.C.

(57) ABSTRACT

The present invention pertains to a slide for a gravity-fed sorting machine. An optimum gravity slide configuration comprises one or more channels, with or without dividing ribs, and a product guide. The product guide has support tabs integral to or otherwise extending from its perimeter. Those tabs allow the product guide to be supported along it perimeter by brackets while retaining certain degrees of freedom regarding its ability to move. Specifically, the tabs rest in notches in the underlying support brackets that allow the product guide to be lifted up, thus permitting a potential obstruction to pass. Additionally, the brackets themselves are adjustably mounted to the sides of the slide. That allows the product guide's height above the channel bottom or dividing ribs to be varied to provide a clearance to best accommodate the particular product being sorted.

12 Claims, 4 Drawing Sheets

FIG. 1
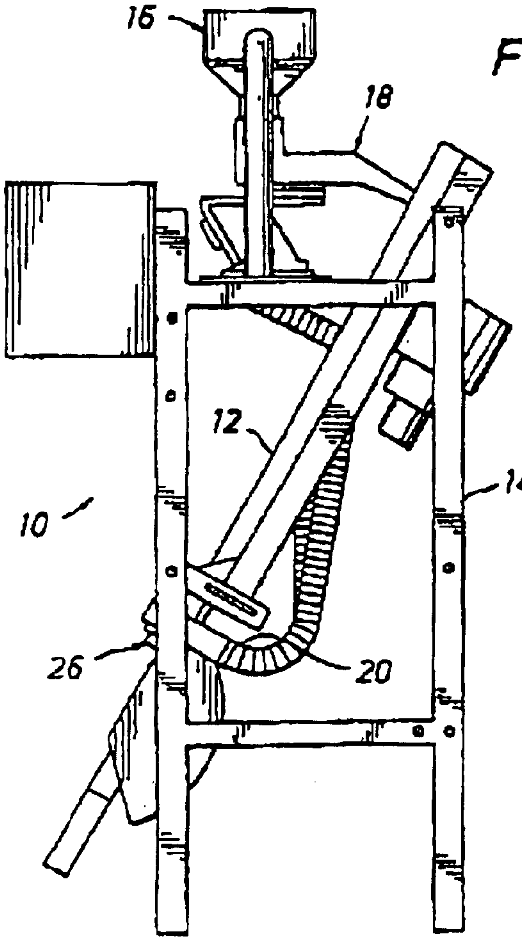
-PRIOR ART-
FIG. 2
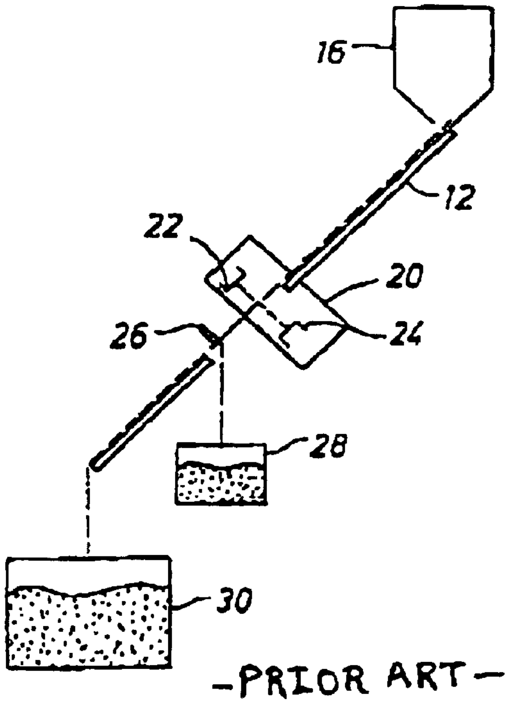
-PRIOR ART-
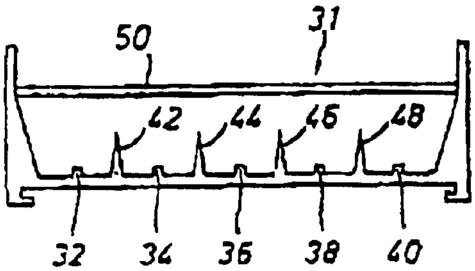
FIG. 3
FIG. 4
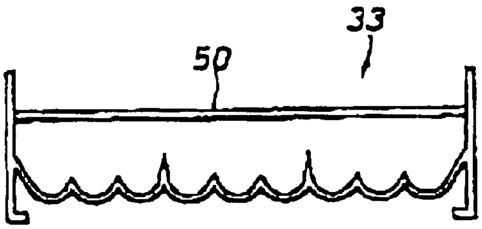

SLIDE FOR SORTING MACHINE

BACKGROUND OF THE INVENTION

1. Field of the Invention

This invention pertains to a slide for a sorting machine and more particularly to a slide for handling high volume products. The product to be sorted may include specimens with color defects or of irregular size or shape, or foreign objects.

2. Description of Prior Art

A typical sorting machine of the type using the present invention can be characterized as a gravity-fed channel sorter. Such a sorter incorporates a slide or chute at a steep angle having one or more channels across its width. A hopper or other feed system is positioned to dispense its product on the top of the slide. If multiple channels are used, the slide is divided across its width and configured so that an approximately evenly proportioned number of dispensed products are directed to each of the channels. Such techniques of distributing to each channel the proper amount of product being dispensed onto the slide is well-known in the art. A typical slide has numerous channels that may number as high as 64 or more, although slides for many machines in service today have only a limited number of channels, like 8, and in some applications it is preferable to use a single channel.

Gravity slide sorters have been in use for many years, sorting a wide variety of food products and many non-food products as well. Early sorters were single channel units, with a "C"-, "U"-, or "V"-shaped slide conveying product to a viewing area. Later, larger sorters were developed with 2, 6, 8, 12, etc., individual slides on a single frame. These individual slides were similar to the slides used on the single channel units, but economies were gained by constructing multiple slides on a single frame. These sorters presented multiple linear streams, or "strings", of product to be viewed.

In the early 1980's, in response to the need for higher capacity sorters and to the need to sort products which would not flow smoothly down a slide, flat belt sorters were introduced. These sorters presented a wide sheet of product to the viewer.

In the mid-1980's a type of sorter was introduced which combined the simplicity and space efficiency of the discreet channel sorter with the high throughput capability of the belt sorter. These "broad slide" sorters presented multiple flat streams of product to the viewer. The total throughput of these multiple flat streams was often equal to the throughput of competing belt sorters. Early applications of this type of sorter were primarily in cereal grains such as rice. It has recently been demonstrated that this type of sorter can be applied to a variety of other products such as tree nuts, ground nuts, beans, etc., which had previously been sorted on smaller discreet slide sorters or on belt sorters. With this expansion of the application of broad slide sorters, several technical challenges have arisen concerning the design of the overall slide arrangement and the design of the configuration of each individual channel used on a broad slide sorter.

Successful sorters have been developed for cereal grains using wide, flat slides, which present a "sheet" of product to the viewer/ejector system. This is similar to the product presentation of the belt sorter. Other successful sorters have been developed using slides that are also wide and flat, but in addition, have a series of dividing ribs separating the sheet of product into a series of "ribbons" of product, one per channel. These ribbons are presented to the viewer/ejector system oriented so that each ribbon passes in front of only one ejector. This important feature eliminates the condition of a defective product or article passing through the viewer in a location that causes two adjacent ejectors to fire at the same product, which often ejects an excessive amount of acceptable product along with the unacceptable. Logically, by eliminating the condition of product flowing through the zone of more than one ejector, a slide divided into channels, as just described, results in fewer total ejector fires and the removal of less good product. The innovation described below can be applied to both undivided and divided slide sorters, but the advantages of aligning ribbons of product flow with slide ejectors make the divided slide system more attractive in most applications. This difference is even more significant as the sorter is applied to products larger than cereal grains or to highly contaminated product flows.

The purpose of the slide is to accelerate and singulate the product, and to present it uniformly into the viewing area. For optimum sorting of certain types of products on slide chutes, it was discovered long ago that a product guide across the top of a chute was desirable to stabilize product flow in the chute of the slide sorter. Such a product guide is also known as a "keeper". Product guides have been used for many years to control bounce and tumbling on a slide and to knock down stacked product. Such a guide, usually a thin, flexible, plastic strip, is placed above the product flow. Conventionally, the width of the strip is selected so that it rests on the sides of the channel, or on the channel dividers, allowing the product to flow freely under it. The strip remains near the product so that if the product bounces up, or if product is riding one on top of another, the product is forced back down to flow evenly in the bottom of the channel. For most products, a product guide improves product flow.

Such slides have been used on a variety of products. However, a common problem with such slide arrangements is jamming or blocking of a channel. The obstructing object may be too large to enter the channel beneath the product guide, or, once in the channel, rotate to an orientation that causes it to become lodged. This can occur because of oversized product or large foreign objects.

A recent improvement to stabilize product flow when sorting larger products such as lentils or plastic flakes was to modify the height of certain dividing ribs of the chute. It has been found that the optimum channel configuration for many applications is to modify the dividing rib arrangement by reducing the height of every other rib. This modification allows the majority of the product flow to be controlled by the respective channels, as it would be if all ribs were in place, achieving the objective of oriented product flow so that each ribbon of product passes in front of only one ejector. However, if a large piece of product or a piece of foreign material or a misshaped product is fed into a channel, instead of being jammed in the channel and disrupting product flow, it can "overflow" into the adjacent channel and is passed through the sorter.

It is also known in the art that for round or oblong products, such as nuts and beans, the bottoms of the channels in the multiple channel slide, instead of being flat, generally should be rounded. For both the flat- and rounded-bottomed channels, the selection of a particular slide is determined by the size and shape of the product being sorted. The objective is to match the size of the channel to the size of the product so that it flows smoothly without excessive bounce, but is not slowed by running too tightly in a channel. Newer existing sorters, to optimize flow, use a channel profile matching the shape of the product being sorted in conjunction with interspersed dividing ribs of full height to support the product guide. Full or tall height dividing ribs occurring at every third divider rib position, or even less frequently, have been successfully used to support the product guide. While this improves (by reducing) the frequency of jams, jams still occur. Thus, the need exists for an improved arrangement in which fewer jams occur.

SUMMARY OF THE INVENTION

The present invention pertains to a slide for a gravity-fed sorting machine. The slide may be divided into multiple channels for separate viewing and ejection sorting action. The slide is positioned for use by being established at a large angle to the horizontal. Product to be sorted is deposited from a hopper or otherwise directed to the channel or various channels and to slide down them. Each channel may be flat- or round-bottomed, as desired, and is separately viewed in an electro-optical viewing station so that an ejector aligned with the channel and downstream from the viewing station fires to remove nonstandard or defective products or other objects. The dividing ribs between channels, when present, are at least as high as to ordinarily keep the products from transferring from one channel to the next. The dividing ribs may be of different heights. A product guide or keeper is supported across the top of the slide to prevent products from excessive bouncing or "piggyback" stacking.

An optimum gravity slide configuration comprises one or more channels, with or without dividing ribs, and a product guide. An improvement in product control is achieved by exploiting a new product guide design. The product guide itself is modified to have support tabs integral to or otherwise extending from its perimeter. Those tabs allow the product guide to be supported by support brackets, as explained below, while retaining certain degrees of freedom regarding its ability to move. Specifically, the tabs rest in notches in the underlying support brackets that allow the product guide to be lifted up, thus permitting a potential obstruction to pass. Additionally, the brackets themselves are adjustably mounted to the sides of the slide. That allows the product guide's height above the channel bottom or dividing ribs to be varied to provide a clearance to best accommodate the particular product being sorted.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 1 is a side view of a gravity-fed sorter using a slide in accordance with the present invention.

FIG. 2 is a schematic representation of product being sorted in a channel of a slide, the product stream passing through a viewing station for removing defective products and foreign objects subject to sorting in a collection bin apart from the bin for acceptable product.

FIG. 3 is an end view of a flat-bottomed multiple-channel slide in accordance with the present invention, wherein every other divider rib is a tall height divider rib.

FIG. 4 is an end view of a radius-bottomed multiple-channel slide in accordance with the present, wherein every third divider rib is a tall height divider rib.

DESCRIPTION OF THE PREFERRED EMBODIMENTS

Figure 5:
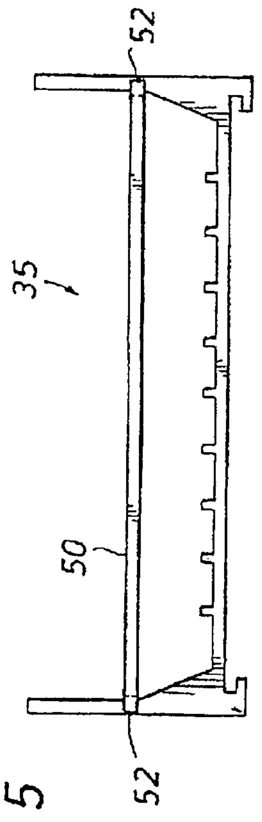
FIG. 5 is an end view of a flat-bottomed multiple-channel slide in accordance with the present invention, wherein all divider ribs are small height divider ribs.

Now referring to the drawings, and first to FIG. 1, a high speed gravity-fed sorter for separating nonstandard fungible products or items from a passing stream or flow of such products is shown. Generally, machine 10 includes multiple channels across a slide 12. Slide 12 is established by the machine at a steep angle to the horizontal, usually on the order of 60 degrees. Slide 12 is held in its position by a framework 14. The gravity-fed products to be sorted are fed from hopper 16, or otherwise, hopper 16 also being attached to framework 14 at its top so that the product feeds through a dividing vibratory feeder 18 to the channels on slide 12, preferably evenly distributing about the same number of products in each of the channels.

The products to be separated or sorted are typically small fungible items, such as coffee beans, rice grains, plastic shards, or the like. In some applications, however, larger products such as large-cut dried onions, in-shell pecans, in-shell walnuts, or in-shell peanuts are sorted. In those application, better results may be obtained using only one channel. For ease of discussion, however, the described embodiments will refer to multiple channel slides unless stated otherwise. It will be appreciated that all such products are readily individually identifiable and distinguishable by color or shade of color in one or more spectral bands. The feed from the hopper via the vibratory feeder and down the respective channels is all by gravity action. The flow of the products is only slowed from free fall by the friction and normal (perpendicular) force from the surface of the slide, as well as the interaction forces among descending products. The products do move, however, at a fast rate and in large quantity, as is well known in the art.

An optical viewing station 20 is located along the slide at about the two-thirds position from the top. As the flow of products flows past the station, nonstandard or substandard products, as well as foreign objects, are sensed or detected.

When a nonstandard product or a foreign object is sensed, an electrical signal is produced that results in an ejection of such product or object by an ejector 26 located in close proximity to the product stream and located at a predetermined distance beneath the viewing station. Typically, the ejector is a pneumatically operated nozzle that produces an air jet and is activated after a predetermined delay time once the item to be removed has been detected in the corresponding viewing station. That is, an actuating electrical signal is produced in the viewing station electronics that, in turn, causes the expulsion or removal of the nonstandard item from the product stream.

FIG. 2 shows the functioning of the related components of the sorting machine in schematic fashion. Products and foreign objects to be inspected and sorted are released from hopper 16 to the top of a channel on slide 12, possibly through intermediate means (not shown in FIG. 2). Alternatively, the gravity-fed source of the items to be sorted can be from a continuously operating conveyor belt or other automated conveyor means. The released items in the channel drop and tumble down the channel and are viewed through an opening in the channel at viewing station 20. Viewing station 20 includes a light source 22 that produces a light ray in the visual or nearby spectrum so as to reflect from the items and be detected by light detector 24. In an actual machine, the slide is configured, as more fully described below, to deliver the released items in a series of adjacent ribbons or channel streams of products. Detection typically occurs in either a single spectral band or in two spectral bands as developed in the viewing station by a separate optical viewer for each channel product ribbon. Alternatively, two opposed optical viewers are employed for each product ribbon. Viewing occurs in a viewing window where the product ribbon is aligned opposite the gap in the channel. In the scheme employing two spectral bands and two opposed viewers, nonstandard reflection in either band from either of the two light-source-and-detector combinations produces an electrical signal pulse to actuate the channel ejector, as discussed above. In FIG. 2, this is channel ejector 26. Ejected products and foreign objects are deflected from the free-fall path through the open space in the channel so as to fall in bin 28, which is properly positioned for this purpose. Products that are determined to be standard or acceptable pass onto the lower part of the channel and eventually are dispensed off its end to be collected in receiving bin 30. For continuous operation, either or both the standard and sorted nonstandard products could be gathered instead on properly positioned continuously moving conveyor belts or other material handling means, if desired.

Now turning to FIG. 3, a ten-channel slide 31 is shown having a flat bottom. Every other channel divider rib 32, 34, 36, 38, and 40 is of a height only high enough to keep the normal flow of products within a channel, which height is much less than the height of a normal product. However, divider ribs 42, 44, 46, and 48 that are respectively interspersed with divider ribs 32, 34, 36, 38, and 40 have a height that is appreciably higher. This rib arrangement allows a larger than normal or misshaped product or foreign object that would ordinarily jam a same dimension channel of a slide having all tall ribs to ride over rib 32, 34, 36, 38, or 40 and to lap over into the adjacent channel without jamming the operations, so long as there is adequate clearance under the product guide 50.

FIG. 4 shows around-bottomed slide 33 with every third divider rib of tall height, and FIG. 5 shows a flat-bottomed slide 35 having all short divider ribs. An advantage to multiple adjacent short divider ribs is that an exceptionally large object can overlap several channels and perhaps not jam and interrupt operations. It also allows multiple ejectors to act on the oversized and probably overweight object (as compared to acceptable product). The multiple ejectors then stand a better chance of removing the unacceptable object from the product stream, as desired.

Figure 6:
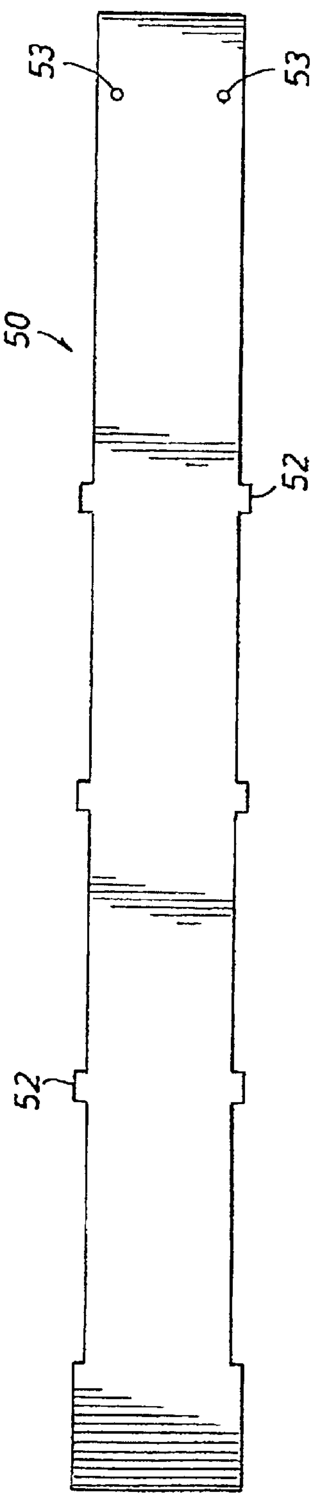
FIG. 6 is a plan view of one embodiment of a product guide constructed in accordance with the present invention.
Figures 8, 9, 10:
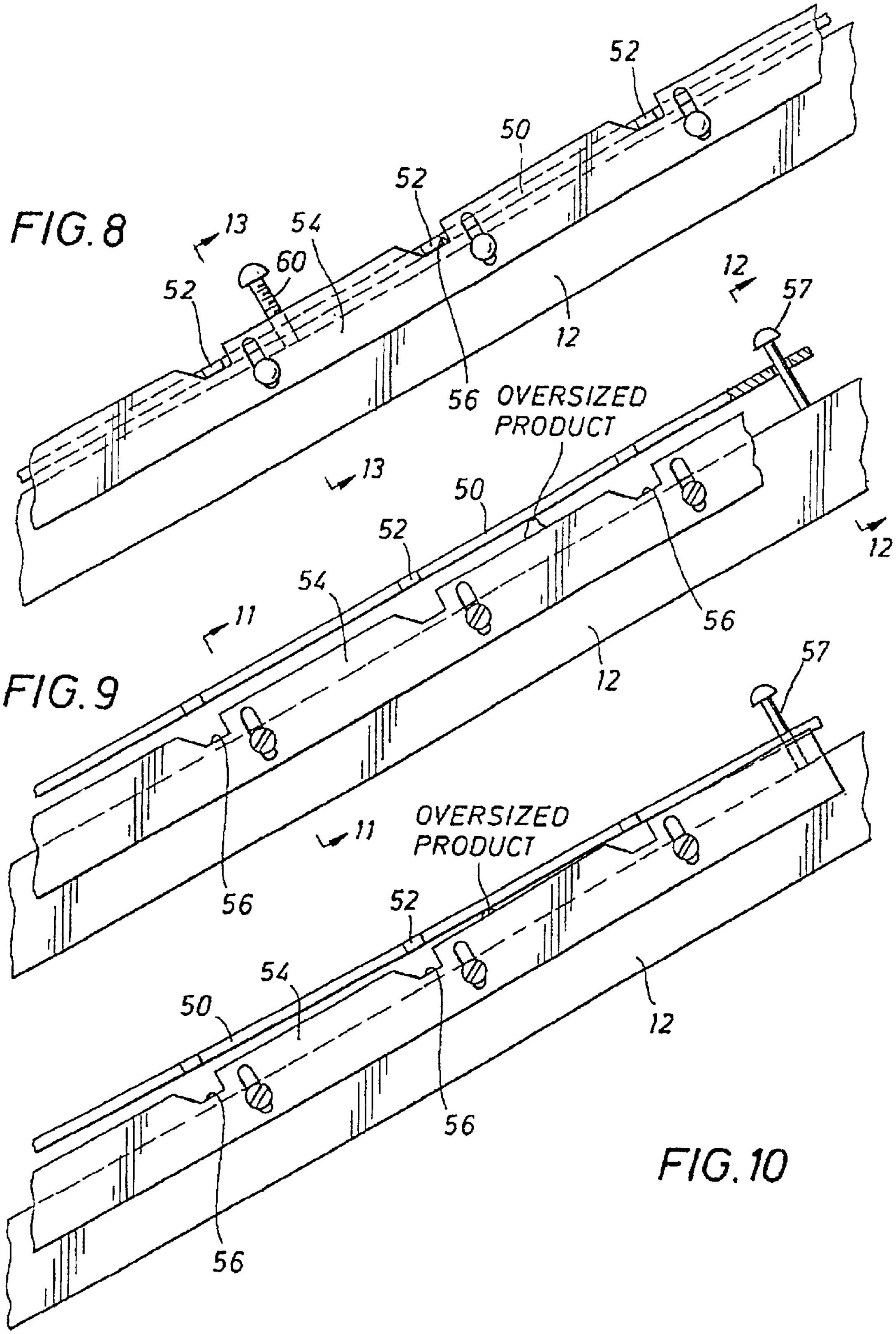
FIG. 8 is a side view of one embodiment of a chute and product guide constructed in accordance with the present invention.
FIG. 9 is a side view of a second embodiment of a chute and product guide constructed in accordance with the present invention.
FIG. 10 is a side view of a third embodiment of a chute and product guide constructed in accordance with the present invention.

FIG. 6 shows a product guide 50 designed to be supported at multiple locations along its periphery. Such a design tends to assure adequate clearance to minimize jams and yet maintain product guide 50 in sufficient proximity to slide 12 to be effective to minimize bounce, preventing the stacking of tumbling products, and unstacking stacked products. Product guide 50 is generally constructed of moderately rigid, yet lightweight materials, such as thermoplastic. The product guide 50 shown has holes 53 near its uppermost end through which it is secured by screws, pins, or other suitable fasteners 57 to the structure of slide 12 or some other nearby support structure such as frame 14. This prevents product guide 50 from falling off the sorter should it be raised higher than the extent of its other support members (described below). Although moderately rigid, product guide 50 has sufficient flexibility to rotate (by flexure) about those constraints (FIG. 10). Alternatively, holes 53 may be slightly oversized relative to the fasteners so that product guide 50 can be rigidly displaced away from or toward the surface of slide 12 (FIG. 9). Tabs 52 protrude from the perimeter of product guide 50 in an evenly spaced manner. The tabs 52 can be integrally formed into the perimeter of product guide 50 or they may be attached to product guide 50. The number of tabs 52 required will vary according to the length and weight of product guide 50.

Figure 7:
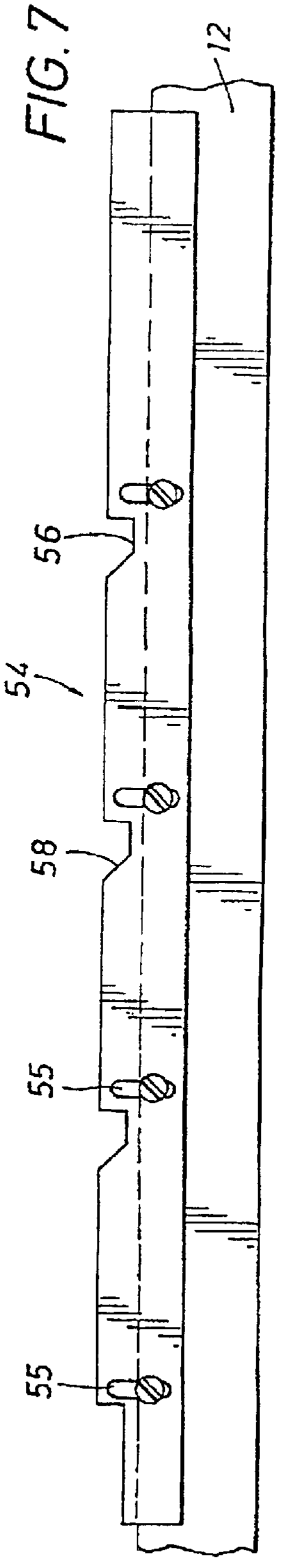
FIG. 7 is a side view of one embodiment of a support bracket constructed in accordance with the present invention.

FIG. 7 illustrates support bracket 54. Support bracket 54 has an adjustment mechanism 55 to secure it to the side of slide 12. An identical bracket attaches in like manner to the opposite side of slide 12 to form a complementary pair. In the embodiments shown, brackets 54 are adjustably mounted to the slide 12. Thus, the height of brackets 54 can be raised or lowered relative to the slide 12. Along the upper edge of brackets 54 are evenly spaced alignment notches 56. Notches 56 receive and partially constrain tabs 52 when product guide 50 is in its normal operational position. Spacing of the notches 56 corresponds to the spacing of tabs 52. FIG. 7 shows the shape of a notch 56 as a right angle notch modified so that the downstream edge 58 of the notch is tapered at approximately 45 degrees away from the notch. That tapered edge 58 helps restore the product guide 50 to its operational position after being displaced therefrom. Identically shaped and placed notches are formed in the sides of the slide 12 so as to not interfere with the tabs 52 when the brackets 54 are lowered to their lowest position. In a simpler embodiment (not shown), bracket 54 can be merged into and its function performed by the side of slide 12, but this loses the benefit of being able to adjust the height of product guide 50 using adjustment mechanism 55.

Figure 13:
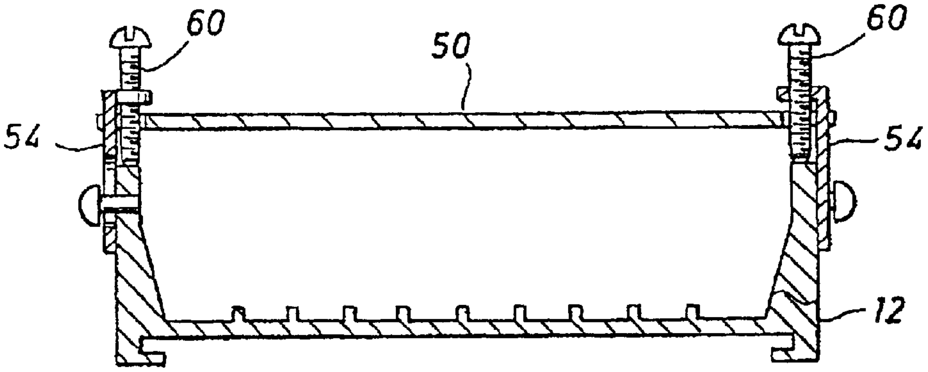
FIG. 13 is a section view of the embodiment of FIG. 8 taken along Section 13—13.

During operations of the preferred embodiment, product guide 50 is placed some desired height above the channel bottom or tallest dividers. Depending on the product being sorted, the desired height is obtained by adjusting the support brackets 54. Various adjustment mechanisms can be used as shown in FIGS. 7 and 8. The adjustment mechanism 55 in the embodiment described above (FIG. 7) uses slotted openings with fasteners to secure brackets 54 at the desired height. Another possible mechanism (FIGS. 8 and 13) would include threaded posts 60 that extend or retract perpendicularly to the bottom surface of slide 12. Still another embodiment (not shown) would use smooth posts extending perpendicularly from the surface of slide 12 on which brackets

Figure 11:
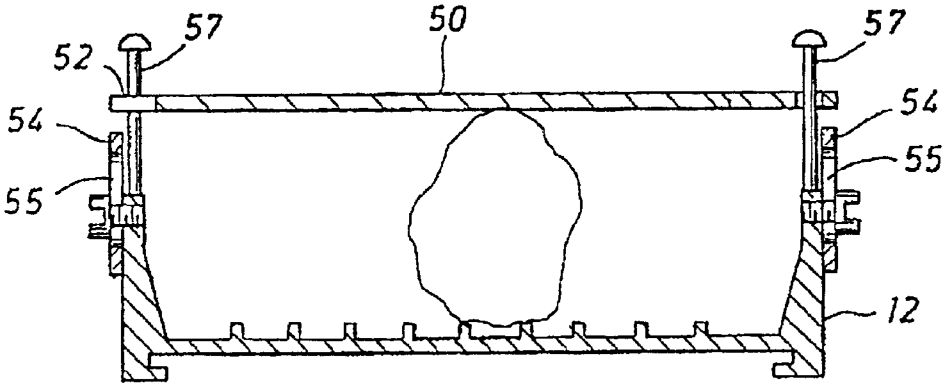
FIG. 11 is a section view of the embodiment of FIG. 9 taken along Section 11—11.
Figure 12:
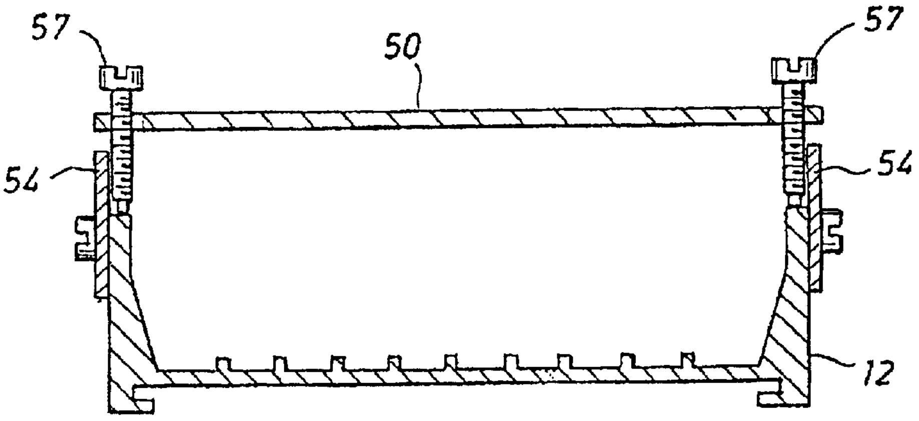
FIG. 12 is a section view of the embodiment of FIG. 9 taken along Section 12—12.

54 slide, the height being fixed by set screws. Product guide 50 is supported by tabs 52 and spans the slide 12. Normally tabs 52 are nestled in the notches 56 and rest therein. However, if a large object enters a channel and contacts the product guide 50, product guide 50 moves upward away from the slide 12 in response to the contact forces from the potentially obstructing object, as shown in FIGS. 9 and 10. By moving upward, greater clearance is gained and the large object is able to pass relatively unimpeded through the viewing area, get detected, and ultimately be ejected from the product stream. FIGS. 11 and 12 show the lifted product guide 50 accommodating an oversized object.

While several preferred embodiments of the invention have been described and illustrated, it will be understood that the invention is not limited thereto, since many modifications may be made and will become apparent to those skilled in the art. For example, a two-channel slide may have only side supports for a product guide 50, the divider between the channels being low enough to permit irregular and/or oversized products and foreign objects to overlap into the other channel, as discussed above.

What is claimed is:

1. A slide for a gravity slide sorter comprising:

an inclined chute having a chute upper end, a bottom and two sides;

a first support bracket and a second support bracket, said first support bracket and said second support bracket each mounted to a side of the chute, each of said first and second support brackets having an upper edge distal said chute bottom;

each of said first and second support brackets having at least one alignment notch located on its upper edge;

a product guide supported by said support brackets;

said product guide having a guide upper end and two guide sides;

said product guide having at least one guide tab extending from each said guide side;

at least one guide tab receivable in each said at least one alignment notch of said first support bracket;

at least one guide tab receivable in each said at least one alignment notch of said second support bracket;

attachment means attaching said guide upper end to said chute upper end;

said attachment means limiting movement of said product guide laterally in relation to said chute bottom; and said attachment means allowing relative movement of said product guide normal to said chute bottom.

2. The slide of claim 1 further including:

each of said first and second support brackets having at least one adjustment mechanism;

each said at least one adjustment mechanism operable to adjust the height of said bracket upper edges in relation to said chute bottom.

3. The slide of claim 2 wherein said attachment means comprising:

at least one elongated pin extending from said chute; and at least one pin-receiving opening provided in said product guide.

4. The slide of claim 2 wherein:

the product guide is constructed of a flexible material; and the product guide flexibly moveable upwardly from the bottom of the chute responsive to forces imparted by a product intermediate the chute and the product guide.

5. The slide of claim 2 wherein:

each said alignment notch defining a notch bottom and two notch edges; and the notch edge distal said chute upper end comprising a tapered edge such that the notch opening is wider at the bracket upper edge than at the notch bottom.

6. The slide of claim 2 wherein:

each said adjustment mechanism comprises a slotted opening in one of said first and second support mechanisms and a corresponding screw and threaded opening in a corresponding said chute side.

7. The slide of claim 1 wherein said attachment means comprising:

at least one elongated pin extending from said chute; and at least one pin-receiving opening provided in said product guide.

8. The slide of claim 1 wherein:

the product guide is constructed of a flexible material; and the product guide flexibly moveable upwardly from the bottom of the chute responsive to forces imparted by a product intermediate the chute and the product guide.

9. The slide of claim 1 wherein the chute further includes:

a plurality of channel dividers extending upwardly from the channel bottom; and at least one of said plurality of channel dividers a different height from at least one other said plurality of channel dividers.

10. The slide of claim 1 wherein:

each said alignment notch defining a notch bottom and two notch edges; and the notch edge distal said chute upper end comprising a tapered edge such that the notch opening is wider at the bracket upper edge than at the notch bottom.

11. The slide of claim 1 wherein the tabs are integral with the product guide.

12. The slide of claim 1 wherein:

said attachment means comprising at least two pins extending from said chute upper end and at least two pin-receiving openings in said product guide.

* * * * *